US012658589B2

(12) United States Patent
Wang et al.

(10) Patent No.: US 12,658,589 B2
(45) Date of Patent: Jun. 16, 2026

(54) ELECTRONIC DEVICE HAVING ANTENNA TUNING COMPONENTS ACROSS A KNUCKLE

(71) Applicant: Apple Inc., Cupertino, CA (US)

(72) Inventors: Han Wang, Campbell, CA (US); Aobo Li, Saratoga, CA (US); Victor C Lee, Santa Clara, CA (US); Yuancheng Xu, San Jose, CA (US); Ahmed Ali Abdelhaliem Nafe, Cupertino, CA (US); Enrique Ayala Vazquez, Watsonville, CA (US); Yiren Wang, Cupertino, CA (US); Yuan Tao, Santa Clara, CA (US); Christopher Q Ma, San Francisco, CA (US); Zhiheng Zhou, Zhangjiagang (CN); Sherry Cao, San Francisco, CA (US); Dale T Morgan, San Jose, CA (US); Timothy L Stickles, Mountain View, CA (US); Hao Xu, Cupertino, CA (US); Hongfei Hu, Cupertino, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 18/458,699

(22) Filed: Aug. 30, 2023

(65) Prior Publication Data

US 2024/0079786 A1 Mar. 7, 2024

Related U.S. Application Data

(60) Provisional application No. 63/403,667, filed on Sep. 2, 2022.

(51) Int. Cl.
*H01Q 9/04* (2006.01)
*H01P 3/08* (2006.01)
*H01Q 1/24* (2006.01)

(52) U.S. Cl.
CPC ............. *H01Q 9/0442* (2013.01); *H01P 3/08* (2013.01); *H01Q 1/243* (2013.01); *H01Q 9/0421* (2013.01)

(58) Field of Classification Search
CPC ..... H01Q 9/0442; H01Q 1/243; H01Q 9/0421
See application file for complete search history.

(56) References Cited

U.S. PATENT DOCUMENTS 9,608,310 B2 3/2017 Huang
9,686,385 B2 6/2017 Li (Continued)

*Primary Examiner* — Graham P Smith
(74) *Attorney, Agent, or Firm* — Treyz Law Group, P.C.; Michael H. Lyons

(57) ABSTRACT

An electronic device may be provided with peripheral conductive housing structures, a first antenna, and a second antenna. A gap may divide the housing structures into a first segment forming an arm of the first antenna and a second segment forming an arm of the second antenna. A first feed terminal may be coupled to the first segment and a second feed terminal may be coupled to the second segment. Switchable components may be coupled in parallel between the first and second feed terminals across the gap. The switchable components may be adjusted to tune the frequency response of the first and/or second antenna. The switchable components may have a first state in which only the first feed terminal feeds the first antenna and may have a second state in which both the first and second feed terminals feed the first antenna.

20 Claims, 9 Drawing Sheets

(56) References Cited

U.S. PATENT DOCUMENTS

| | | | |
|---|---|---|---|
| 9,813,532 B2 | 11/2017 | Kim et al. | |
| 10,314,186 B2 | 6/2019 | Wang et al. | |
| 2019/0393586 A1* | 12/2019 | Ayala Vazquez ...... | H01Q 5/328 |

* cited by examiner

ELECTRONIC DEVICE HAVING ANTENNA TUNING COMPONENTS ACROSS A KNUCKLE

This application claims the benefit of U.S. Provisional Patent Application No. 63/403,667, filed Sep. 2, 2022, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry and a housing having peripheral conductive housing structures. A dielectric-filled gap may divide the peripheral conductive housing structures into a first segment and a second segment. The wireless circuitry may include a first antenna and a second antenna. The first antenna may have an arm formed from the first segment and may have a first feed terminal on the first segment. The second antenna may have an arm formed from the second segment and may have a second feed terminal on the second segment. The first feed terminal may be coupled to a first signal conductor of a first transmission line. The second feed terminal may be coupled to a second signal conductor of a second transmission line.

Tuning components may be coupled between the first feed terminal and the second feed terminal across the gap. The tuning component may include multiple switchable components and a fixed inductor coupled in parallel between the first feed terminal and the second feed terminal across the gap. The switchable components may be adjusted to tune the frequency response of the first and/or second antenna. The switchable components may, for example, have a first state in which only the first feed terminal feeds the first antenna and may have a second state in which both the first and second feed terminals feed the first antenna. This may help to optimize performance of the first and second antennas in different frequency bands such as 5G NR frequency bands N77, N78, and N79, as well as a cellular midband, WLAN bands, WPAN bands, etc.

The electronic device may have a flexible printed circuit with a first portion and a second portion. The first portion may be bent about a first axis. The second portion may be bent about a second axis different from the first axis. The first signal conductor and the tuning component may be disposed on the first portion. The second signal conductor may be disposed on the second portion. A first conductive screw may couple the tuning components and the first signal conductor to the first segment at the first feed terminal. A second conductive screw may couple the tuning components and the second signal conductor to the second segment at the second feed terminal.

DETAILED DESCRIPTION

Figure 1:
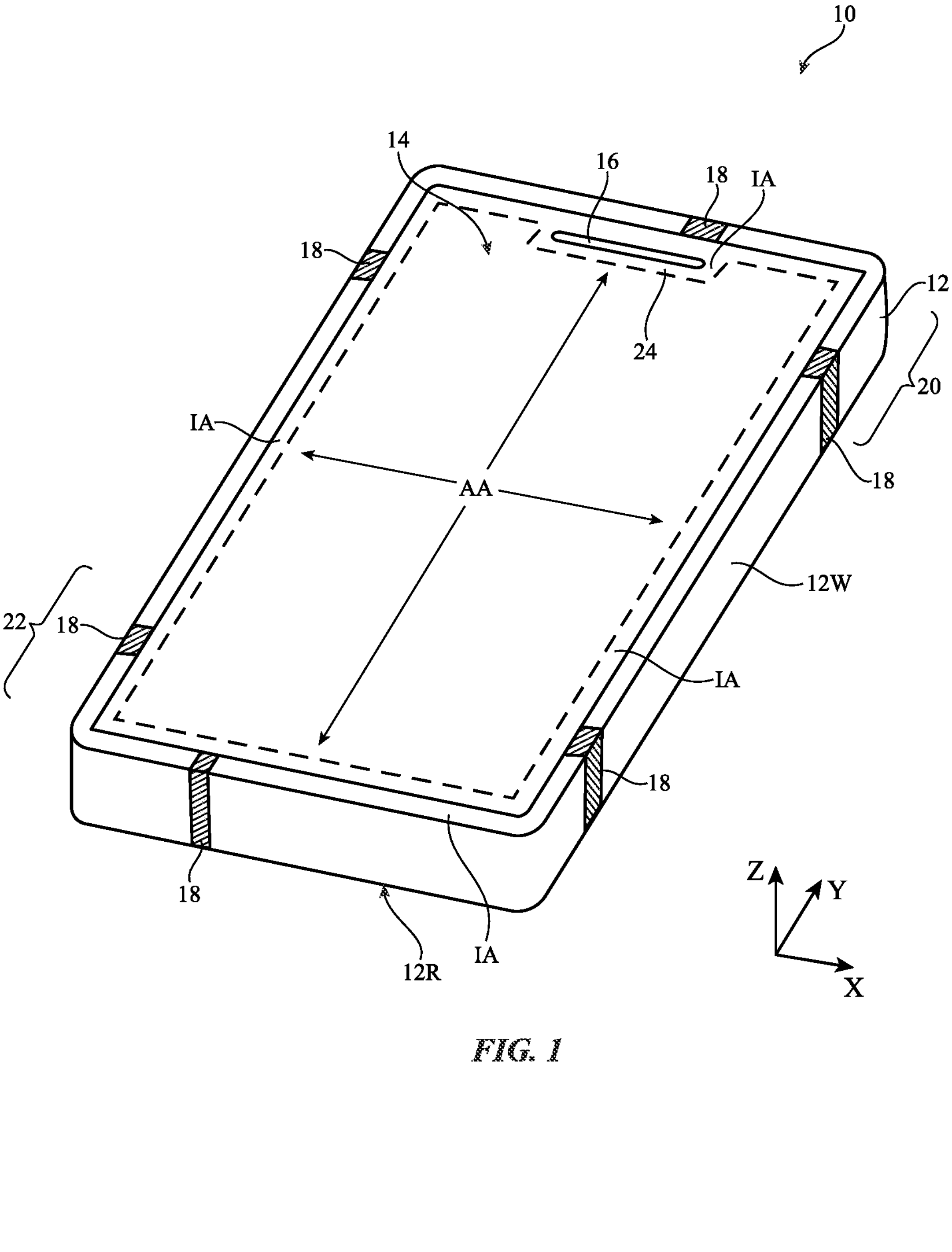
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined)

on three sides by active area AA and on a fourth side by peripheral conductive housing structures 12W. One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
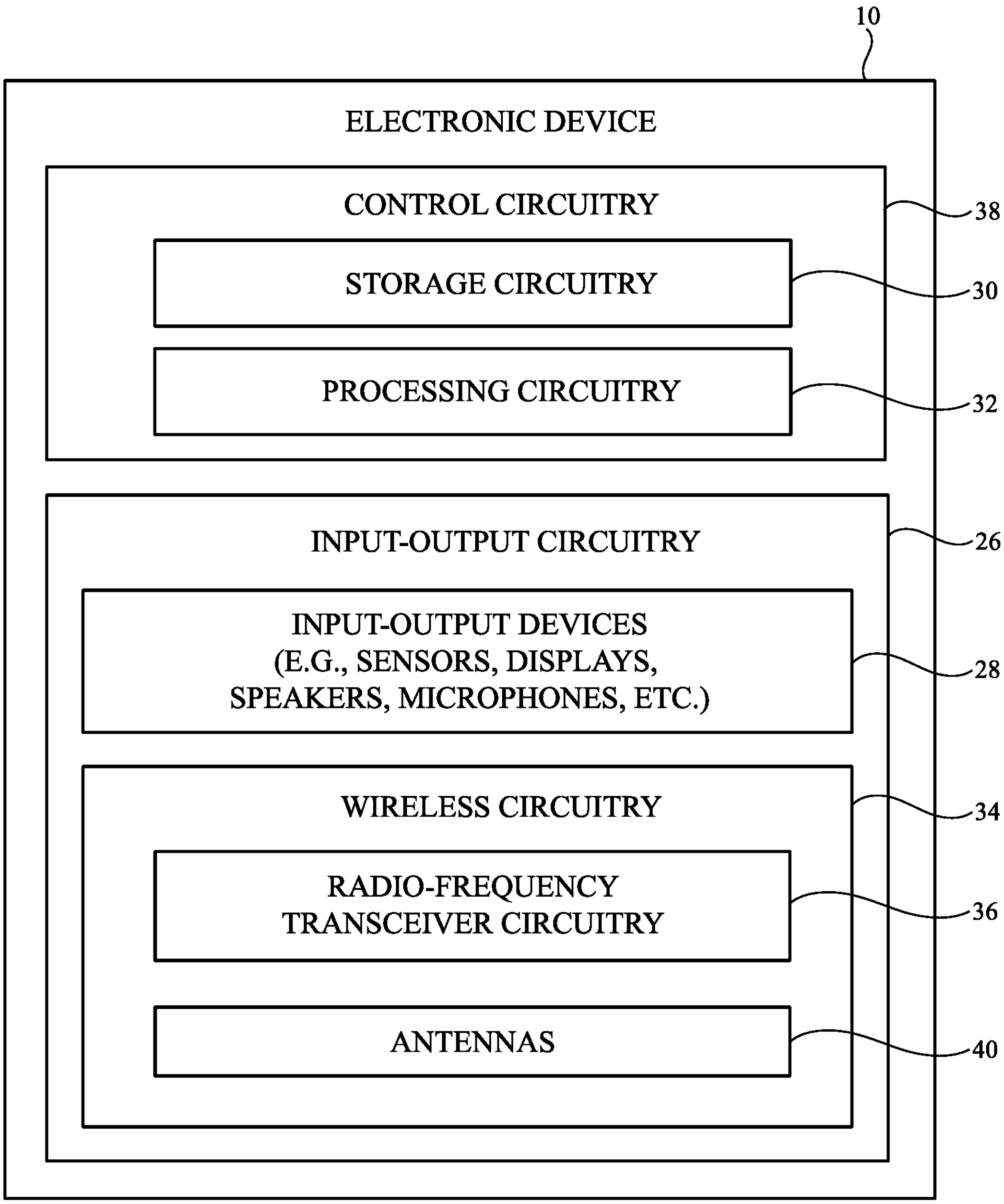
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
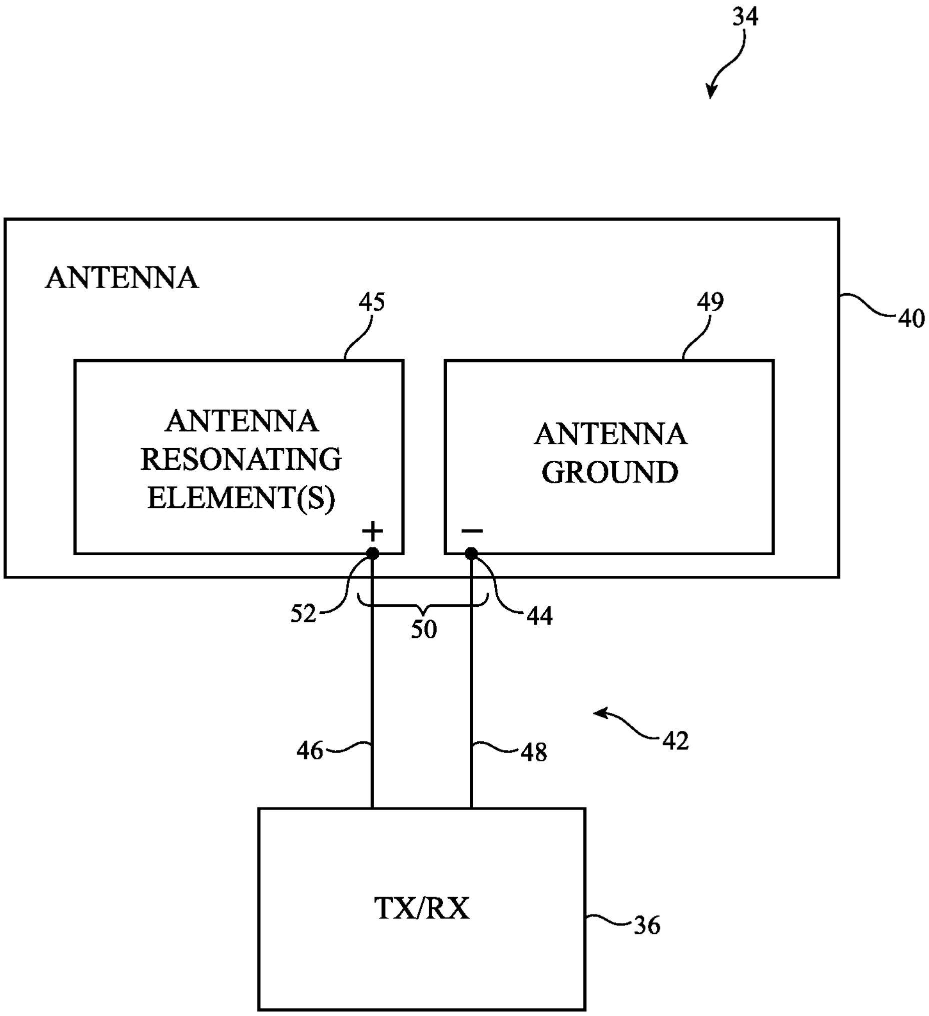
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
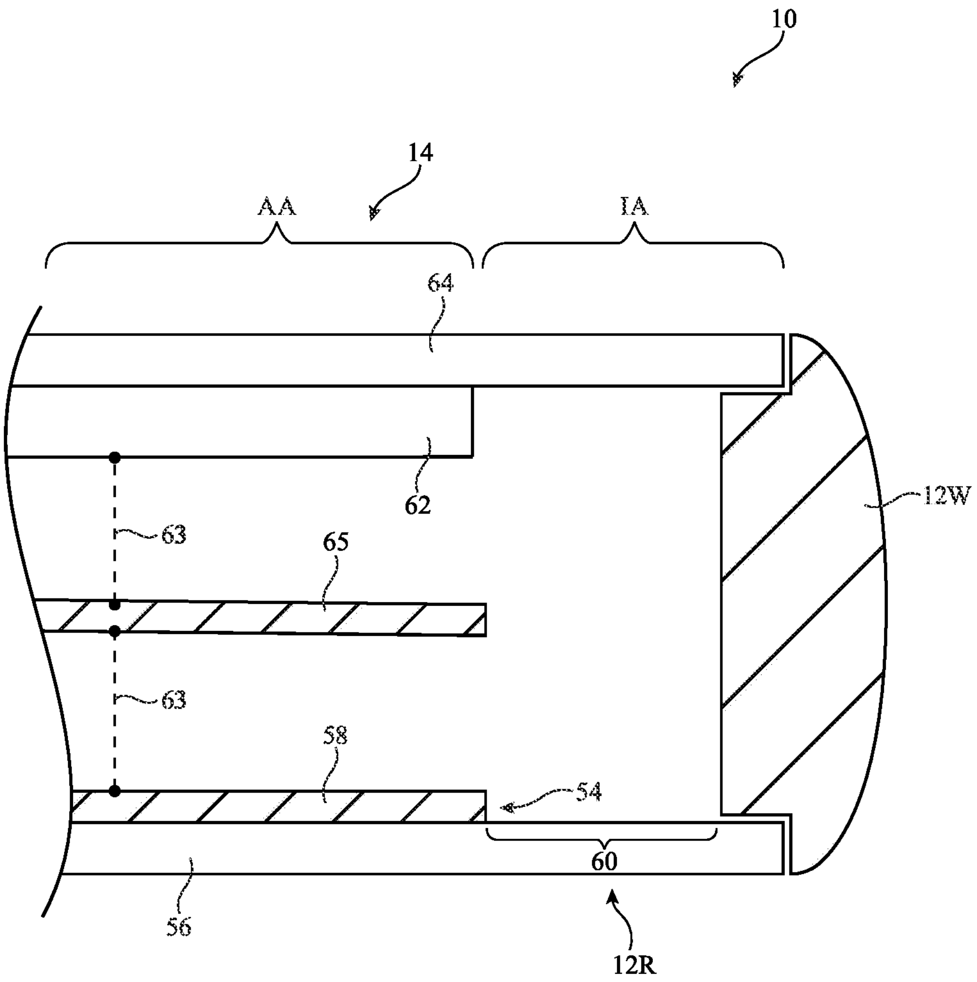
FIG. 4 is a cross-sectional side view of an illustrative electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis 65 may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10.

For example, peripheral conductive housing structures 12W may form an antenna resonating element arm (e.g., an inverted-F antenna resonating element arm) in the antenna resonating element 45 of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
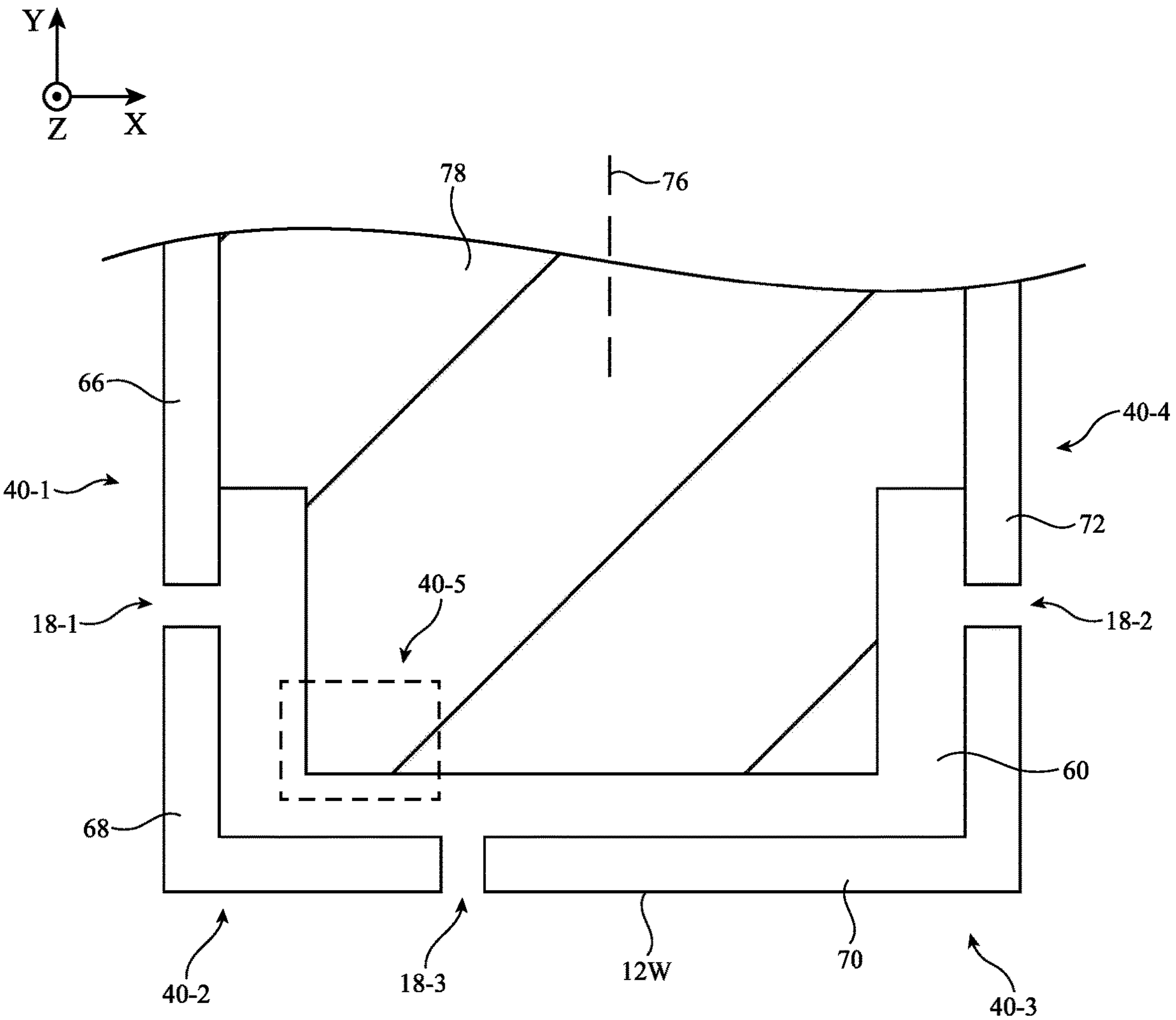
FIG. 5 is a top interior view of the lower end of an illustrative electronic device having peripheral conductive housing structures with dielectric gaps for forming at least first and second antennas in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as conductive support plate 58 (FIG. 4), mid-chassis 65 (FIG. 4), conductive display structures, conductive interconnect structures 63 (FIG. 4), conductive traces on a printed circuit board, conductive portions of one or more components in device 10, etc. Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration). Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include a first antenna 40-1 having an antenna resonating (radiating) element formed from segment 66 and/or a portion of slot 60 (e.g., a vertically extending end of slot 60 that extends parallel to longitudinal axis 76 and past gap 18-1, between segment 66 and ground structures 78) and having an antenna ground formed from ground structures 78. Device 10 may also include a second antenna 40-2 having an antenna resonating element (e.g., a resonating element arm) formed from segment 68 and having an antenna ground formed from ground structures 78. Device 10 may also include a third antenna 40-3 having an antenna resonating element (e.g., a resonating element arm) formed from segment 70 and having an antenna ground formed from ground structures 78. Device 10 may also include a fourth antenna 40-4 having a slot antenna resonating element formed from segment 72 and/or a portion of slot 60 between segment 72 and ground structures 78. Antennas 40-2 and 40-3 may be, for example, inverted-F antennas having return paths that couples the respective resonating element arms to the antenna ground. If desired, device 10 may also include a fifth antenna 40-5 at least partially overlapping the volume of antenna 40-2. Fifth antenna 40-5 may include an antenna resonating element arm formed from conductive traces on a flexible printed circuit and may have an antenna ground formed from ground structures 78. Antennas 40-1, 40-2, 40-3, 40-4, and 40-5 may convey radio-frequency signals in one or more frequency bands (e.g., using MIMO communications in one or more of bands, thereby maximizing data throughput).

Figure 6:
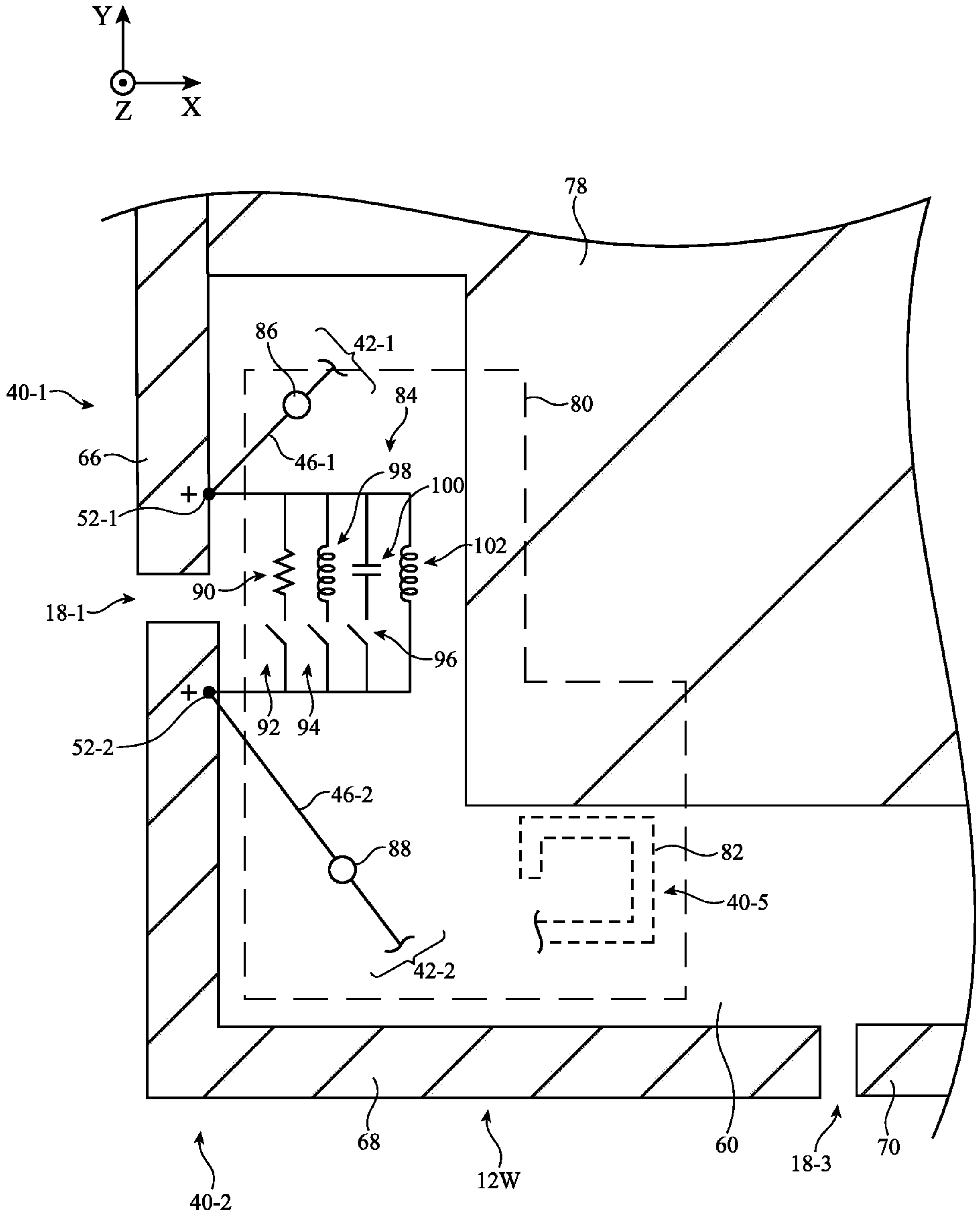
FIG. 6 is a top interview view showing how the antenna feed for a first antenna may also form a supplemental antenna feed for a second antenna across a dielectric gap in peripheral conductive housing structures in accordance with some embodiments.

Antenna 40-1 may occupy a much smaller volume in device 10 than antenna 40-2. It can therefore be difficult for antenna 40-1 to cover all frequencies of one or more frequency bands of interest with satisfactory antenna efficiency. If desired, antenna 40-1 may include a dedicated antenna feed and a supplemental antenna feed via antenna 40-2 that is coupled to the dedicated antenna feed by one or more tuning components. FIG. 6 is an interior rear view showing how antenna 40-1 may include a dedicated antenna feed and a supplemental antenna coupled to the dedicated antenna feed by one or more tuning components.

As shown in FIG. 6, antenna 40-2 may have an antenna resonating element arm formed from segment 68 of peripheral conductive housing structures 12W. Segment 68 may, for example, form an inverted-F antenna resonating element arm for antenna 40-2. Antenna 40-2 may be fed using an antenna feed (e.g., antenna feed 50 of FIG. 3) coupled across slot 60. The antenna feed may have positive antenna feed terminal 52-2 coupled to segment 68 of peripheral conductive housing structures 12W. Antenna 40-2 may be fed by a transmission line path 42-2 having a signal conductor 46-2 coupled to positive antenna feed terminal 52-2. If desired, impedance matching circuitry such as impedance matching circuitry 88 may be interposed on signal conductor 46-2.

Antenna 40-1 may have an antenna resonating element arm formed from segment 66 of peripheral conductive housing structures 12W. Segment 66 may, for example, form an inverted-F antenna resonating element arm for antenna 40-1. Antenna 40-2 may be fed using an antenna feed (e.g., antenna feed 50 of FIG. 3) coupled across the end of 60. The antenna feed may have positive antenna feed terminal 52-1 coupled to segment 66. Antenna 40-1 may be fed by a transmission line path 42-1 having a signal conductor 46-1 coupled to positive antenna feed terminal 52-1. If desired, impedance matching circuitry such as impedance matching circuitry 86 may be interposed on signal conductor 46-1.

Slot 60 may include a vertical portion (end) that extends parallel to longitudinal axis 76 (FIG. 5) and beyond gap 18-1. This portion of slot 60 may extend between segment 66 and ground structures 78 (e.g., segment 66 and ground structures 78 may define opposing edges of the end of slot 60). This portion of slot 60 may have an open end at gap 18-2 and an opposing closed end formed from ground structures 78. This portion of slot 60 may form part of the antenna resonating element for antenna 40-1 (e.g., a slot antenna resonating element) and may therefore contribute to the frequency response of antenna 40-1. Segments 66 and 68 may have knuckle structures at gap 18-1 (not shown) that help to reinforce the mechanical integrity of peripheral conductive housing structures 12W despite the presence of gap 18-1. Gap 18-1 may sometimes also be referred to herein as knuckle 18-1 or split 18-1.

Antenna 40-2 may be fed by a single antenna feed having positive antenna feed terminal 52-2. To broaden the frequency response of antenna 40-1, antenna 40-1 may be fed using both a first antenna feed having positive antenna feed terminal 52-1 and by a second antenna feed having positive antenna feed terminal 52-2 (e.g., positive antenna feed terminal 52-2 may feed both antenna 40-2 and antenna 40-1). Positive antenna feed terminal 52-2 may therefore be coupled to positive antenna feed terminal 52-1 by tuning components 84 coupled across gap 18-1. Tuning components 84 may have a first terminal coupled to positive antenna feed terminal 52-1 and a second terminal coupled to positive antenna feed terminal 52-2.

Tuning components 84 may include one or more resistors, capacitors, inductors, and/or switches arranged in any desired manner between positive antenna feed terminals 52-1 and 52-2. For example, as shown in FIG. 6, tuning components 84 may include a resistor 90, an inductor 98, a capacitor 100 and/or an inductor 102 coupled in parallel between positive antenna feed terminals 52-1 and 52-2. Tuning components 84 may also include switches such as a first switch 92 coupled in series between resistor 90 and positive antenna feed terminal 52-2, a second switch 94 coupled in series between inductor 98 and positive antenna feed terminal 52-2, and a third switch 96 coupled in series between capacitor 100 and positive antenna feed terminal 52-2. Resistor 90 may therefore sometimes be referred to herein as switchable resistor 90, inductor 98 may sometimes be referred to herein as switchable inductor 98, and capacitor 100 may sometimes be referred to herein as switchable capacitor 100. Switches 92-96 may include single-pole single-throw (SPST) switches, other switches, or may be integrated together into a single switch or switching circuit. Tuning components 84 may sometimes be referred to herein as tuning elements 84, tuner 84, or switchable components 84.

Control signals may be provided to tuning components 84 to tune the frequency response of antenna 40-1 and/or antenna 40-2 by adjusting the states of switches 92-96. For example, switch 92 may be toggled to switch antenna 40-1 between a single feed mode and a dual feed mode. In the single feed mode (e.g., when switch 92 is open or turned off), antenna 40-1 is fed only using transmission line path 42-1 and positive antenna feed terminal 52-1 (e.g., decoupling positive antenna feed terminal 52-2 from positive antenna feed terminal 52-1). In the dual feed mode (e.g., when switch 92 is closed or turned on), antenna 40-1 is fed using transmission line path 42-1, positive antenna feed terminal 52-1 (e.g., as part of a primary antenna feed for antenna 40-1), transmission line path 42-2, and positive antenna feed terminal 52-2 (e.g., as part of a secondary antenna feed for antenna 40-1, where positive antenna feed terminal 52-2 concurrently serves as a primary antenna feed for antenna 40-2). Resistor 90 may have a resistance value of 0 Ohms, for example. Resistor 90, inductor 98, and capacitor 100 may sometimes be referred to herein as switchable components.

Switch 94 may be toggled to tune the frequency response of antenna 40-1 in one or more frequency bands (e.g., within and/or between the cellular HB and a 2.4 GHz WLAN/WPAN band). Inductor 98 may have an inductance of 6-7 nH, 5-8 nH, 6.8 nH, or other values, as examples. Switch 96 may be toggled to tune the frequency response of antenna 40-1 between two or more frequency bands. Switch 96 may, for example, switch antenna 40-1 between a first state in which antenna 40-1 covers the 5G NR band N79 between 4400 and 5000 MHz but not the 5G NR bands N77 and N78 between 3400 MHz and 3600 MHz and a second state in which antenna 40-1 covers the 5G NR bands 77 and 78 but not the 5G NR band 79. Capacitor 100 may have a capacitance of 0.4 pF, 0.1-1.0 pF, 0.3-0.5 pF, 0.2-0.6 pF, or other values. Inductor 102 (e.g., a fixed inductor) may have an inductance that is configured to tune the frequency response of antenna 40-2 in a corresponding frequency band such as the cellular MB. Inductor 102 may, for example, have an inductance of 20 nH, 10-30 nH, 10-40 nH, or other values. In this way, tuning components 84 may help to optimize and broaden the overall frequency response of antennas 40-1 and 40-2 by selectively bridging gap 18-1 and by selectively feeding antenna 40-1 with supplemental antenna current from positive antenna feed terminal 52-2 and transmission line path 42-2.

As shown in FIG. 6, impedance matching circuitry 86 and 88 and tuning components 84 may be mounted to a shared underlying substrate such as printed circuit 80. Printed circuit 80 may be a rigid printed circuit board or a flexible printed circuit. Implementations in which printed circuit 80 is a flexible printed circuit are described herein as an example. If desired, antenna 40-5 may have an antenna resonating element arm 82 that is formed from conductive traces on printed circuit 80.

Figure 7:
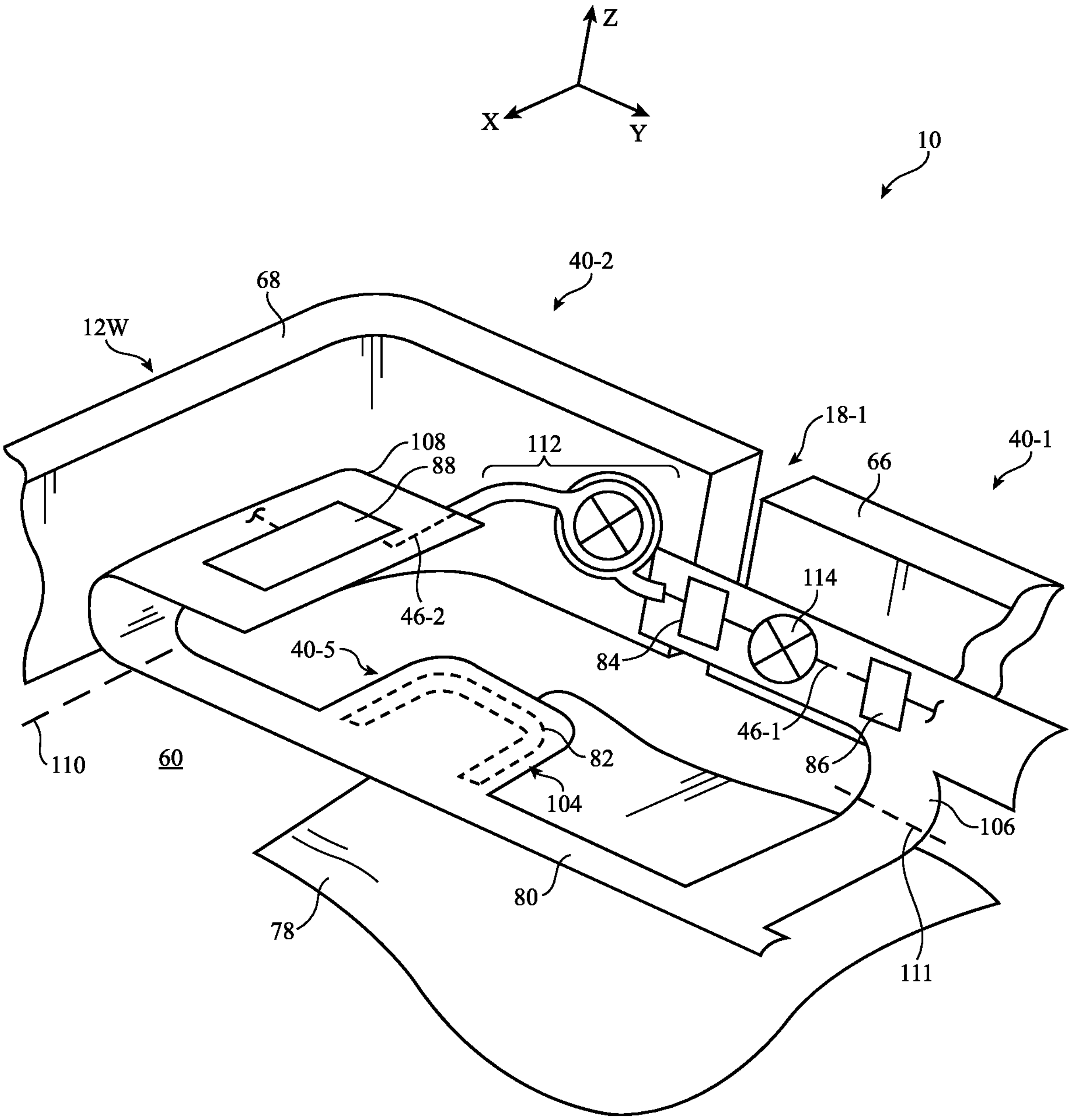
FIG. 7 is an interior perspective view showing how an illustrative printed circuit may feed first and second antennas of the type shown in FIG. 6 in accordance with some embodiments.

FIG. 7 is an interior perspective view showing how printed circuit 80 may be mounted within device 10. Display 14 (FIG. 4) and other internal components of device 10 have been removed from FIG. 7 for the sake of clarity. As shown in FIG. 7, printed circuit 80 may include at least a first portion 106 and a second portion 108. Portions 106 and 108 may sometimes be referred to herein as arms or tails of printed circuit 80. Portion 108 may be folded upwards about axis 110. Printed circuit 80 may also include a portion (stub) 104. The antenna resonating element arm 82 for antenna 40-5 may be formed from conductive traces on portion 104 of printed circuit 80. At least some of printed circuit 80 (e.g., portions 108 and 106) may overlap slot 60 between ground structures 78 and segments 68 and 66.

Portion 106 may be folded upwards about axis 111 and may run along the interior surface of segment 66. The end of portion 106 may span or cross gap 18-1. Transmission line path 46-1 for antenna 40-1 may extend through portion 106. Impedance matching circuitry 86 may be mounted to portion 106 and disposed on transmission line path 46-1. Impedance matching circuitry 86 may, for example, include surface mount technology (SMT) components on portion 106.

Transmission line path 46-1 may be coupled to interconnect structure 114. Conductive interconnect structure 114 may include a conductive trace, a conductive pin, a conductive spring, a conductive prong, a conductive bracket, a conductive screw, a conductive clip, conductive tape, conductive foam, conductive adhesive, solder, welds, a metal member (e.g., a sheet metal member), a contact pad, a conductive via, and/or any other desired conductive interconnect structures. Conductive interconnect structure 114 may couple transmission line path 46-1 to segment 66 at positive antenna feed terminal 52-1 (FIG. 6). Conductive interconnect structure 114 may also mechanically secure portion 106 of printed circuit 80 to the interior of segment 66 of peripheral conductive housing structures 12W.

Conductive interconnect structure 114 may also be coupled to a first terminal of tuning components 84. Tuning components 84 may include SMT components mounted to portion 106 of printed circuit 80 (e.g., capacitor 100, inductor 102, inductor 98, and/or resistor 90 of FIG. 6 may be SMT components). In other words, conductive interconnect structure 114 may couple tuning components 84 to segment 66 at positive antenna feed terminal 52-1 (FIG. 6).

Portion 108 of printed circuit 80 may include transmission line path 46-2. Impedance matching circuitry 88 may be mounted to portion 108 and disposed on transmission line path 46-2. Impedance matching circuitry 88 may, for example, include surface mount technology (SMT) components on portion 108.

Tuning components 84 may have a second terminal coupled to conductive interconnect structures 112. Conductive interconnect structures 112 may couple tuning components 84 to transmission line path 46-2 on portion 108 of printed circuit 80 (e.g., conductive interconnect structures 112 may pass antenna current from transmission line path 46-2 onto tuning components 84). Conductive interconnect structures 112 may also couple both tuning components 84 and transmission line path 46-2 to segment 68 of peripheral conductive housing structures at positive antenna feed terminal 52-2 (FIG. 6). Conductive interconnect structures 112 may also mechanically secure portion 108 of printed circuit 80 to the interior of segment 68 of peripheral conductive housing structures 12W.

Conductive interconnect structures 112 may include conductive traces, conductive pins, conductive springs, conductive prongs, conductive brackets, conductive screws, conductive clips, conductive tape, conductive foam, conductive adhesive, solder, welds, metal members (e.g., sheet metal members), contact pads, conductive vias, and/or any other desired conductive interconnect structures. Conductive interconnect structures 112 may, for example, include a first conductive member coupled to transmission line path 46-2 on portion 108, a second conductive member coupled to tuning components 84 on portion 106, and a conductive screw that passes through openings in the first and second conductive members to mechanically and electrically couple the first and second conductive members to segment 68.

Figure 8:
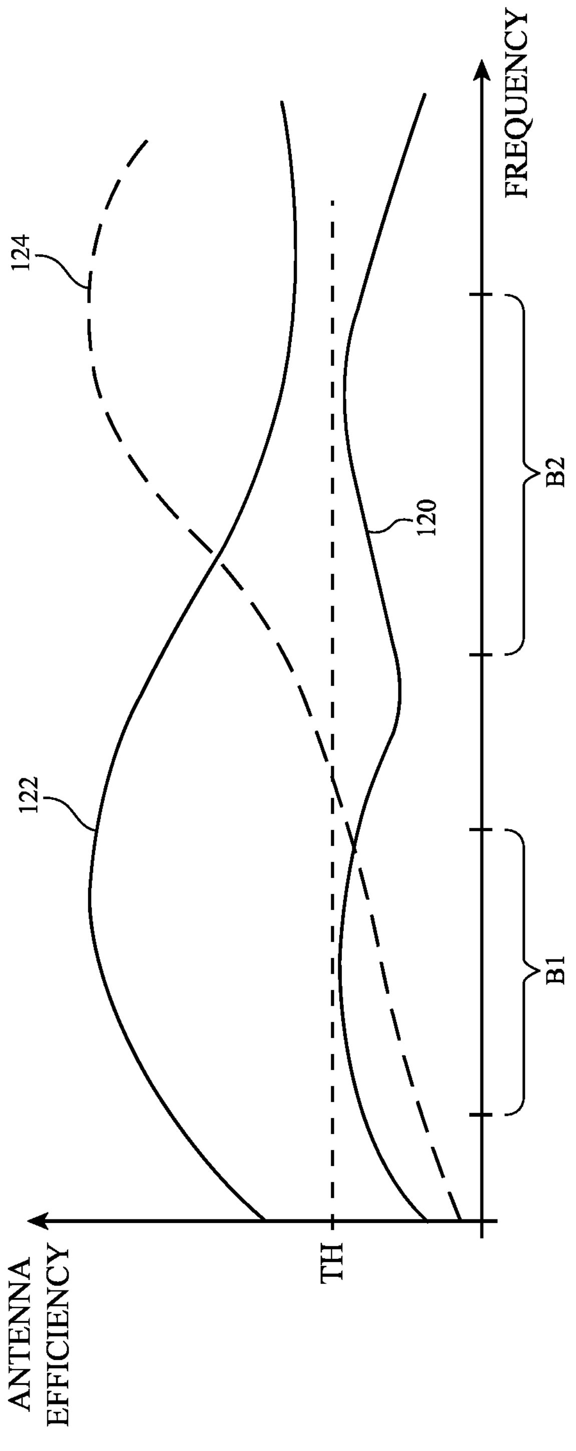
FIGS. 8 and 9 are plots of antenna efficiency as a function of frequency showing how the tuning components of FIGS. 6 and 7 may maximize antenna performance in accordance with some embodiments.

The switches in tuning components 84 spanning (bridging) gap 18-1 may be controlled to adjust the frequency response of antenna 40-1 and/or antenna 40-2. FIG. 8 is a plot of antenna performance (antenna efficiency) as a function of frequency illustrating how tuning components 84 may adjust the performance of antenna 40-1.

Curve 120 of FIG. 8 plots the performance of antenna 40-1 in the absence of tuning component 84 coupled across gap 18-1 (e.g., when antenna 40-1 is only fed using positive antenna feed terminal 52-1 and transmission line path 46-1). As shown by curve 120, antenna 40-1 may exhibit peak antenna efficiency (e.g., response peaks) overlapping a first frequency band B1 (e.g., 3400-3600 MHz, which may include bands N77 and N78 as well as cellular UHBs such as band B42 and band B48) and a second frequency band B2 (e.g., 4400-5000 MHz, which may include band N79). However, the response of antenna 40-1 may be relatively limited in the absence of tuning components 84, limiting antenna efficiency to relatively low levels below threshold efficiency TH.

Curve 122 of FIG. 8 plots the performance of antenna 40-1 with tuning components 84 coupled across gap 18-1 while fed using both positive antenna feed terminal 52-1 (transmission line path 46-1) and positive antenna feed terminal 52-2 (transmission line path 46-2) in a first dual feed configuration (e.g., where switch 92 of FIG. 6 is closed and switch 96 of FIG. 6 is in a first state). As shown by curve 122, antenna 40-1 may exhibit peak efficiency in band B1 that exceeds threshold efficiency TH (as well as satisfactory efficiency in band B2).

Curve 124 of FIG. 8 plots the performance of antenna 40-1 with tuning components 84 coupled across gap 18-1 while fed using both positive antenna feed terminal 52-1 (transmission line path 46-1) and positive antenna feed terminal 52-2 (transmission line path 46-2) in a second dual feed configuration (e.g., where switch 92 of FIG. 6 is closed and switch 96 of FIG. 6 is in a second state). As shown by curve 124, antenna 40-1 may exhibit peak efficiency in band B2 that exceeds threshold efficiency TH (as well as satisfactory efficiency in band B1). Control signals may be used to toggle switch 92 between the first and second states to boost performance in band B1 (e.g., bands N77 and N78) or band B2 (e.g., band N79) as needed over time. This may serve to effectively broaden the bandwidth of antenna 40-1 exceeding threshold efficiency TH (e.g., by as much as 4 dB) to include both bands B1 and B2.

Figure 9:
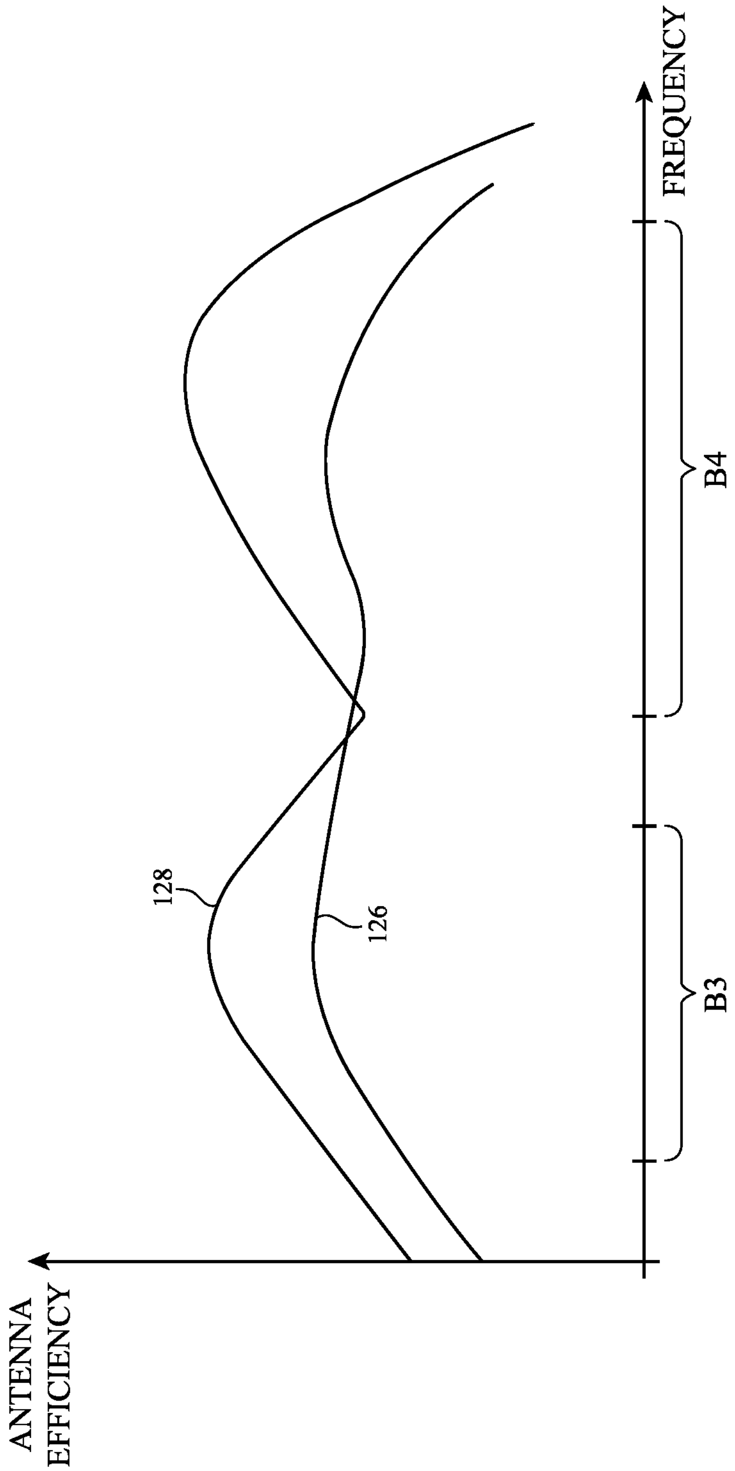

FIG. 9 is a plot of antenna performance (antenna efficiency) as a function of frequency illustrating how tuning components 84 may adjust the performance of antenna 40-2. Curve 126 of FIG. 9 plots the performance of antenna 40-2 in the absence of tuning components 84 coupled across gap 18-1. As shown by curve 126, antenna 40-2 may exhibit peak antenna efficiency (e.g., response peaks) overlapping a third frequency band B3 (e.g., the cellular MB) and a fourth frequency band B4 (e.g., the cellular HB and 2.4 GHz WLAN/WPAN frequencies). However, the response of antenna 40-1 may be relatively limited in the absence of tuning components 84.

Curve 128 of FIG. 9 plots the performance of antenna 40-2 with tuning components 84 coupled across gap 18-1. As shown by curve 128, antenna 40-2 may exhibit peak efficiencies in both bands B1 and B2 that exceed the peaks of curve 126. This may serve to effectively boost performance of antenna 40-2 in one or both of bands B3 and B4. The example of FIGS. 8 and 9 are merely illustrative. In practice, curves 120-128 may have other shapes and may cover any desired frequencies. Antenna 40-5 of FIGS. 6 and 7 may concurrently cover frequencies in a fifth band B5 (e.g., 5 GHz WLAN frequencies between 5180 MHz and 5835 MHz).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

peripheral conductive housing structures having a first segment and a second segment separated by a dielectric-filled gap;

a first transmission line path having a first signal conductor coupled to a first terminal on the first segment;

a second transmission line path having a second signal conductor coupled to a second terminal on the second segment; and tuning components that are outside of the first and second transmission line paths and that couple the first terminal to the second terminal across the dielectric-filled gap.

2. The electronic device of claim 1, wherein the tuning components comprise:

a capacitor coupled between the first and second terminals; and a first switch coupled in series between the capacitor and the first terminal.

3. The electronic device of claim 2, wherein the tuning components further comprise:

a resistor coupled in parallel with the capacitor between the first and second terminals; and a second switch coupled in series between the resistor and the first terminal.

4. The electronic device of claim 3, wherein the tuning components further comprise:

a first inductor coupled in parallel with the capacitor and the resistor between the first and second terminals; and a third switch coupled in series between the first inductor and the first terminal.

5. The electronic device of claim 4, wherein the tuning components further comprise:

a second inductor coupled in parallel with the capacitor, the resistor, and the first inductor between the first and second terminals.

6. The electronic device of claim 1, further comprising:

a flexible printed circuit having a first portion and a second portion extending from an end of the first portion, wherein first signal conductor and the tuning components are disposed on the first portion and the second signal conductor is disposed on the second portion.

7. The electronic device of claim 6, wherein the first portion is folded about a first axis and the second portion is folded about a second axis different from the first axis.

8. The electronic device of claim 6, further comprising:

a first conductive screw that couples the first signal conductor and the tuning components to the first terminal on the first segment; and a second conductive screw that couples the second signal conductor and the tuning components to the second terminal on the second segment;

a first impedance matching circuit mounted to the first portion and disposed on the first signal conductor; and a second impedance matching circuit mounted to the second portion and disposed on the second signal conductor.

9. An electronic device comprising:

peripheral conductive housing structures having a dielectric-filled gap that divides the peripheral conductive housing structures into a first segment and a second segment;

a first antenna having a first arm formed from the first segment and having a first feed terminal coupled to the first segment;

a second antenna having a second arm formed from the second segment and having a second feed terminal coupled to the second segment;

a switchable component that couples the first feed terminal to the second feed terminal across the dielectric-filled gap;

a printed circuit that includes a first portion folded about a first axis and a second portion folded about a second axis different from the first axis, wherein the switchable component is mounted to the printed circuit, the first portion of the flexible printed circuit is coupled to the first feed terminal, and the second portion of the flexible printed circuit is coupled to the second feed terminal.

10. The electronic device of claim 9, wherein the switchable component has a first state in which the first feed terminal feeds the first antenna and the second feed terminal feeds the second antenna and has a second state in which both the first and second feed terminals feed the first antenna and the second feed terminal feeds the second antenna.

11. The electronic device of claim 9, further comprising:

a switchable inductor coupled in parallel with the switchable component between the first feed terminal and the second feed terminal across the dielectric-filled gap.

12. The electronic device of claim 11, further comprising:

a switchable capacitor coupled in parallel with the switchable component and the switchable inductor between the first feed terminal and the second feed terminal across the dielectric-filled gap.

13. The electronic device of claim 12, further comprising:

a fixed inductor coupled in parallel with the switchable component, the switchable inductor, and the switchable capacitor between the first feed terminal and the second feed terminal across the dielectric-filled gap.

14. The electronic device of claim 13, wherein the switchable component comprises a switch and a resistor coupled in series between the first feed terminal and the second feed terminal.

15. The electronic device of claim 9, further comprising:

a fixed inductor coupled in parallel with the switchable component between the first feed terminal and the second feed terminal across the dielectric-filled gap.

16. The electronic device of claim 9, further comprising:

a first conductive screw that couples the printed circuit and the switchable component to the first feed terminal; and a second conductive screw that couples the printed circuit and the switchable component to the second feed terminal.

17. The electronic device of claim 16, wherein the first conductive screw couples the first arm of the printed circuit to the first feed terminal, and the second conductive screw couples the second arm of the printed circuit to the second feed terminal.

18. An antenna comprising:

an antenna ground;

a resonating element arm;

a conductive structure separated from the resonating element arm by a gap;

a first feed terminal on the resonating element arm and coupled to a first signal conductor of a first radio-frequency transmission line;

a switchable component that couples the first feed terminal to a second feed terminal on the conductive structure across the gap, the second feed terminal being coupled to a second signal conductor of a second radio-frequency transmission line that is different from the first radio-frequency transmission line; and a flexible printed circuit that includes a first arm coupled to the first feed terminal and a second arm coupled to the second feed terminal, wherein the first arm includes the first radio-frequency transmission line, the second arm includes the second radio-frequency transmission line, the first arm is folded about a first axis, and the second arm is folded about a second axis different than the first axis.

19. The antenna of claim 18, further comprising:

a switchable inductor that couples the first feed terminal to the second feed terminal across the gap in parallel with the switchable component;

a switchable capacitor that couples the first feed terminal to the second feed terminal across the gap in parallel with the switchable component and the switchable inductor; and a fixed inductor that couples the first feed terminal to the second feed terminal across the gap in parallel with the switchable component, the switchable inductor, and the switchable capacitor.

20. The electronic device of claim 1, further comprising:

first impedance matching circuitry that is different from the tuning components, wherein the first signal conductor couples the first impedance matching circuitry to the first terminal; and second impedance matching circuitry that is different from the first impedance matching circuitry and the tuning components, wherein the second signal conductor couples the second impedance matching circuitry to the second terminal.

* * * * *